(12) United States Patent
Pudney

(10) Patent No.: US 7,311,356 B2
(45) Date of Patent: Dec. 25, 2007

(54) PASSENGER SEAT BLOCKING MECHANISM OR DEVICE

(75) Inventor: Richard I. Pudney, Plymouth, MI (US)

(73) Assignee: Key Plastics, LLC, Northville, MI (US)

( * ) Notice: Subject to any disclaimer, the term of this patent is extended or adjusted under 35 U.S.C. 154(b) by 0 days.

(21) Appl. No.: 11/227,601

(22) Filed: Sep. 15, 2005

(65) Prior Publication Data

US 2006/0061152 A1 Mar. 23, 2006

Related U.S. Application Data

(60) Provisional application No. 60/611,351, filed on Sep. 20, 2004.

(51) Int. Cl.
*B60N 2/32* (2006.01)
(52) U.S. Cl. .......................... 297/188.01; 297/188.21; 297/216.1; 297/487
(58) Field of Classification Search ........... 297/188.01, 297/188.2, 216.1, 487, 488; 119/771; 224/275
See application file for complete search history.

(56) References Cited

U.S. PATENT DOCUMENTS

| 2,369,552 | A | * | 2/1945 | Ferran | 5/94 |
|---|---|---|---|---|---|
| 3,094,354 | A | * | 6/1963 | Bernier | 297/188.04 |
| 3,309,135 | A | * | 3/1967 | Jannetto | 297/188.01 |
| 4,183,582 | A | * | 1/1980 | Taki | 297/464 |
| 4,512,286 | A | * | 4/1985 | Rux | 119/771 |
| 4,943,105 | A | * | 7/1990 | Kacar et al. | 296/24.31 |
| 5,379,469 | A | * | 1/1995 | Millis et al. | 5/95 |
| 5,908,218 | A | * | 6/1999 | Martin | 297/182 |
| 5,967,602 | A | * | 10/1999 | Ptak et al. | 297/188.11 |
| 6,079,773 | A | * | 6/2000 | Hassan | 297/188.13 |
| 6,367,839 | B1 | * | 4/2002 | Langhoff | 280/751 |
| 6,431,645 | B2 | * | 8/2002 | Massara et al. | 297/144 |
| 6,742,837 | B1 | * | 6/2004 | Alexander | 297/188.21 |

* cited by examiner

*Primary Examiner*—Peter R. Brown
(74) *Attorney, Agent, or Firm*—David L. King; Markell Seitzman

(57) ABSTRACT

A blocking mechanism or device (40) for preventing objects from sliding off from a cushion (24) of a seat when a vehicle experiences decelerations above a given level comprising: a blocking member (50, 60) configured to be movable from a storage position below a top surface (26) of the cushion to a blocking position above the top surface of the cushion to block any object on the cushion from moving therefrom.

8 Claims, 10 Drawing Sheets

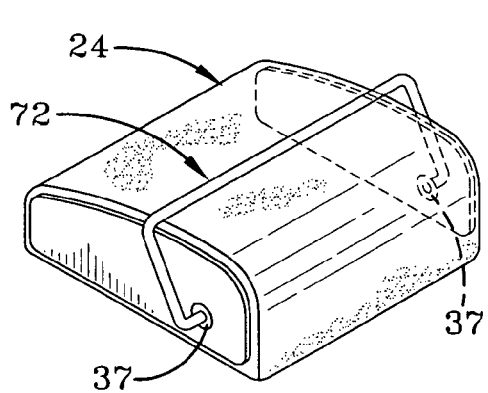
FIG-2b
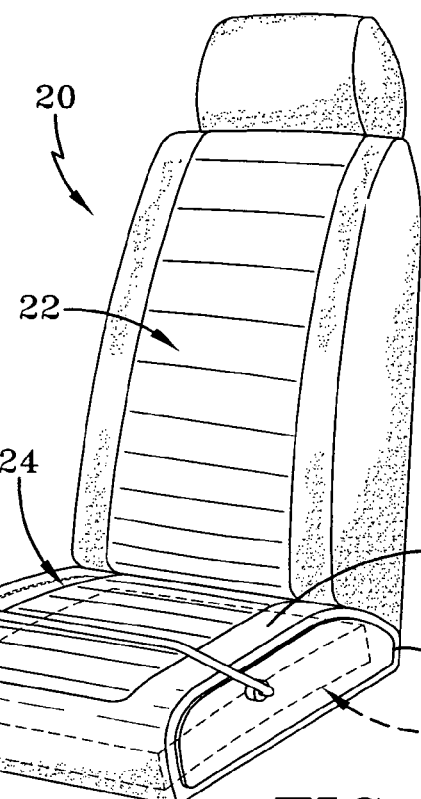
FIG-1
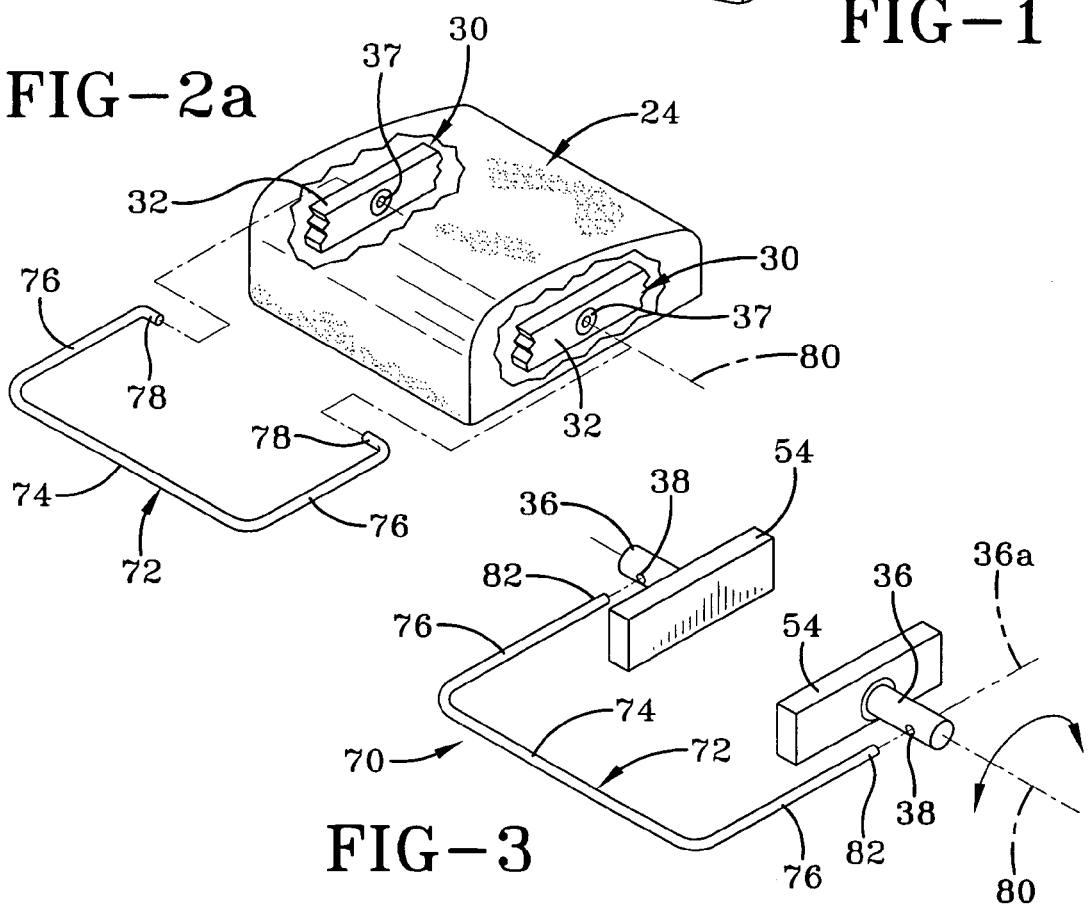
FIG-2a
FIG-3

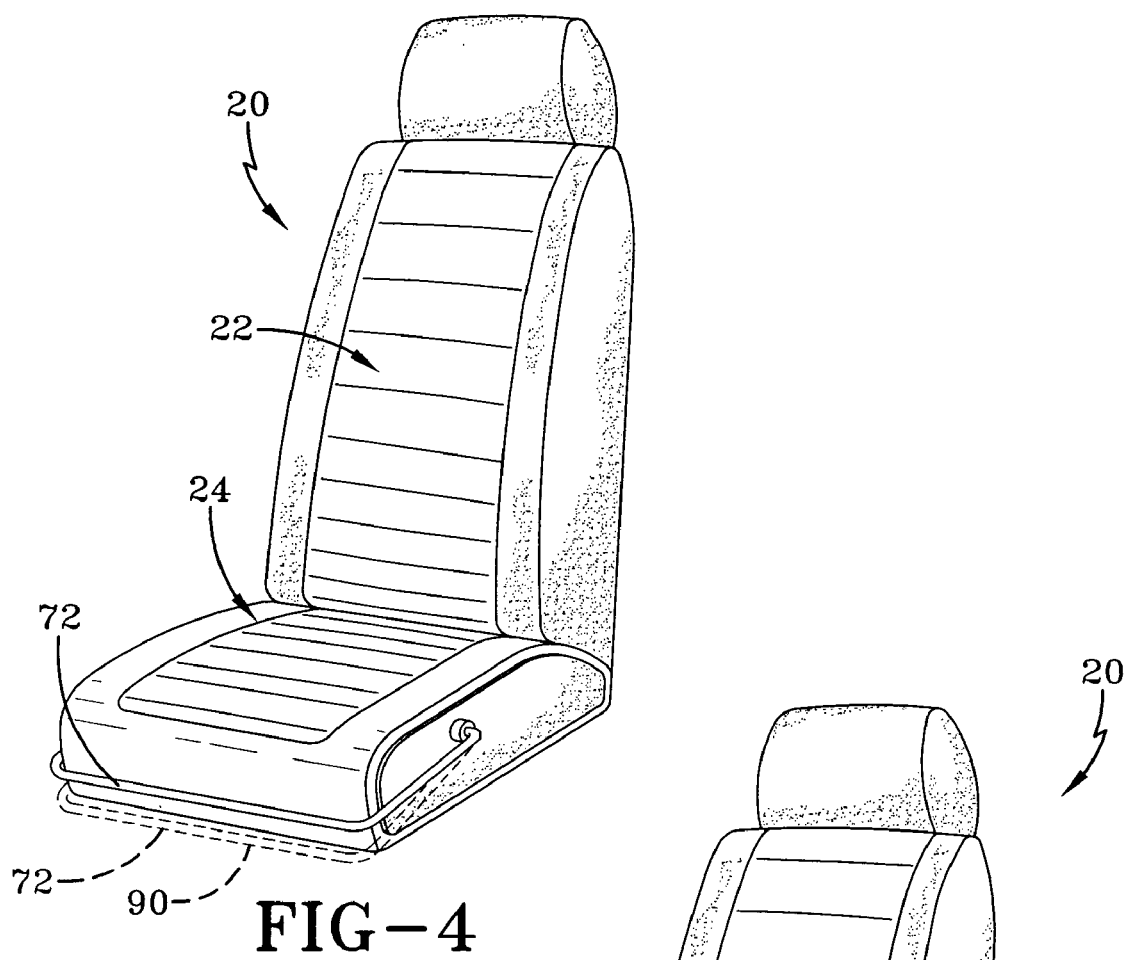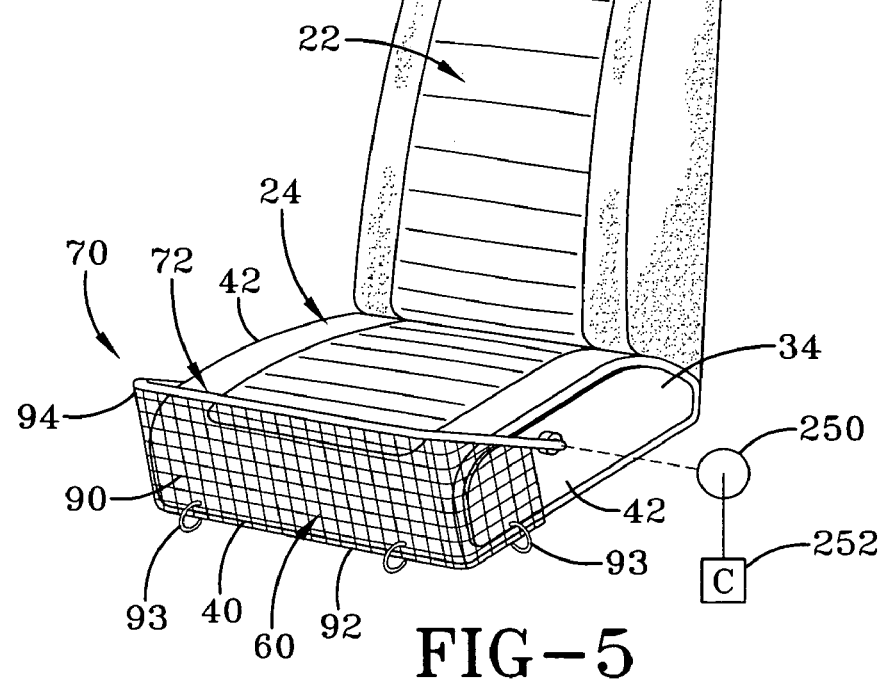

US 7,311,356 B2

PASSENGER SEAT BLOCKING MECHANISM OR DEVICE

This application claims the benefit of U.S. Provisional Application 60/611,351, filed on Sep. 20, 2004. The disclosure of the above application is incorporated herein by reference.

BACKGROUND AND SUMMARY OF THE INVENTION

The present invention relates to a moveable barrier, curtain or shield used in conjunction with a seat, typically a vehicle seat cushion, and more particularly an obstruction, barrier, blockade, curtain or shield to prevent articles or objects on the seat from sliding or falling off the seat as the vehicle rapidly decelerates or rapidly turns.

Reference is briefly made to FIG. 15, which illustrates a typical automotive seat 20 having a seat back 22 and a cushion 24. The seat back and cushion are supported by one or more support structures or frames, as known in the art, such as the cushion frame 30, having parallel rails 32. The cushion is covered by a layer of padding, which is covered by an upholstery material 25 of choice. The top surface 26 of the material forms the seating surface. Various objects are often placed on this surface. In particular the passenger seat is often the repository for packages, newspapers, loose papers, eyeglasses, bottles, cups, etc.

FIG. 15 schematically illustrates a plurality of these objects such as 28a and b loosely placed on the seat cushion. FIG. 15 also shows another object or two, 28c and 28d, located on the floor 30 in front of the seat 20, to illustrate a condition in which these objects have already fallen from or slipped off from the seat cushion onto the floor or into the space between the door and the seat and the center console and the seat. The exterior side 33 (adjacent the door) of the cushion is often covered in part or whole by a rigid plastic trim panel 34. This panel often supports an adjustment lever that extends from the panel 34 or seat control buttons. (The lever or the buttons are not shown in FIG. 15.)

Most vehicle drivers or passengers have participated in the situation of having placed an article or object upon an adjacent, empty seat; the vehicle is then rapidly decelerated or the vehicle turns rapidly, thereby causing one or more objects to roll or slide off from the seating surface 26 onto the floor or become lodged between a side of the seat and a side of the vehicle, or lodged between an opposite side of the seat and a center console, creating a potentially dangerous situation. The danger is created when the driver's attention becomes diverted to look and determine what has slipped from the seat. Occasionally, the driver might even try to recover the object while the vehicle is in gear.

The present invention provides a solution to the above problems.

It is an object of the present invention to provide a device that prevents articles and objects from moving about or off from the seat cushion surface. Accordingly the invention comprises: a blocking mechanism or device for preventing objects from sliding off from a cushion of a seat when a vehicle experiences decelerations or a rapid change of direction. The device comprises a blocking member configured to be movable from a stored position below the top surface of the cushion to a blocking position above the top surface of the cushion to block any object on the cushion from moving off or about the seat Many other objects and purposes of the invention will be clear from the following detailed description of the drawings.

BRIEF DESCRIPTION OF THE DRAWINGS

FIG. 1 shows a first embodiment of the invention.
FIG. 2a shows an embodiment of a hinge-bar relationship.
FIG. 2b shows an embodiment of another hinge.
FIG. 3 shows another hinge-bar combination.
FIG. 4 shows the bar in FIG. 1 in a lowered position.
FIG. 5 shows a movable netting with a bar used to move same, as well as a motorized alternate of the invention.
FIG. 6b is a side plan view of the embodiment in FIG. 6a.
FIG. 12 shows a variation of the embodiment shown in FIG. 6a.

DETAILED DESCRIPTION OF THE DRAWINGS

Figure 6A:
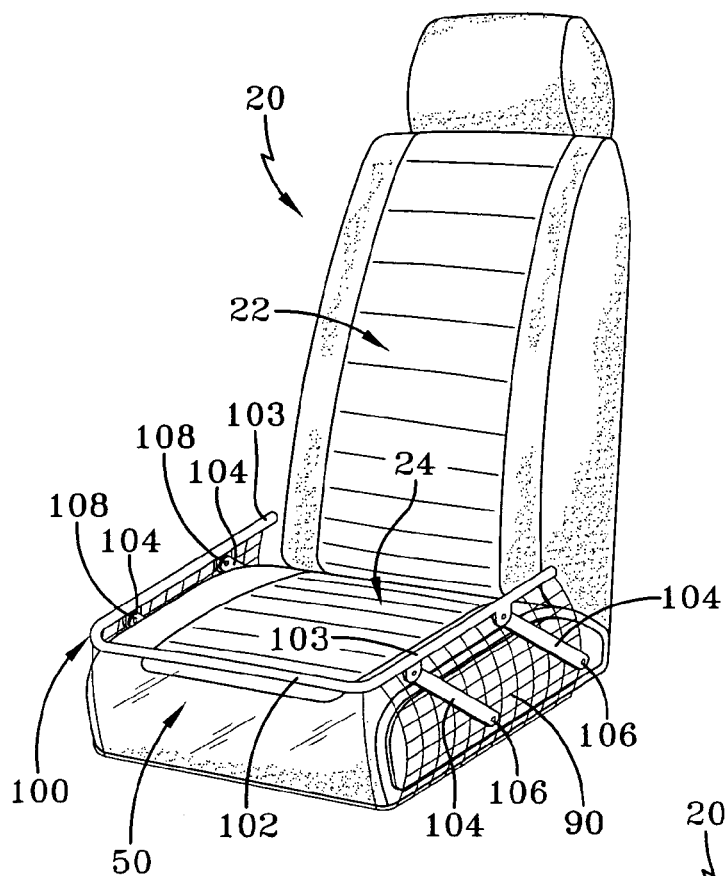
FIG. 6a shows a blocking device using a three-bar linkage shown in an elevated position as well as the use of a flexible sheet.

Reference is made to FIGS. 1-5, which illustrate a selectively locatable blocking mechanism 50 to block objects from moving off from the seat 20. The blocking mechanism 50 includes a blocking member, barrier, fence or obstruction 60 (see FIG. 5) movable from a stowed position below the top surface of the seat cushion to an elevated, active position located sufficiently above the top of the cushion to prevent objects from falling or sliding from the seat.

The blocking mechanism 50 can include a lift member 70 that moves the barrier 60 between its lowered and raised positions. In the first embodiment, see FIG. 1, this lift member 70 is a movable bar 72 that is secured to and carries blocking member 60, configured as a net (or netting). A bar 72 is rotatably mounted relative to the seat 20. In one embodiment the bar is rotatable about portions of the seat frame 30, while in another embodiment the bar is attached to and rotatable about plastic panels such as 34, secured to opposing sides of the seat cushion 24. In the illustrated embodiment, bar 72 is generally U-shaped having a top 74 and sides 76. The bar 72 is moveable from a lowered, stowed, rest or stored position shown in FIG. 4 (in which it is below the top of the seat cushion and out of the way of a seat passenger) to a raised or active position illustrated in FIG. 1. (The barrier 60 is not shown in either FIG. 1 or 4 to simplify the illustration.)

As will be appreciated, the bar 72 can be manually moved, moved by a spring, that is spring biased, or a motor or some combination thereof. In the embodiment of FIG. 2a, the bar 72 may optionally include bent ends or axles 78.

The bar 72 is movable about axis 80 using a hinge. The means by which the hinge is formed can vary with application. FIG. 2a illustrates one construction in which each of the side frame rails 32 of the seat cushion includes a bushing or bearing 37 to rotatably receive the inwardly directed ends or axles 78 of bar 72. As the bar 72 is raised and lowered, the ends 78 rotate within the bushing or bearing 37. FIG. 2b shows another embodiment in which the seat cushion 24 includes two side trim panels 34, each with a bushing 37 to rotatably support the bar 72. One advantage of the embodiment of FIG. 2b is the side panels 24 and the bar 72 can be supplied as an integral assembly and easily installed about the seat cushion.

FIG. 3 shows another way to provide a hinge for the bar. In this embodiment, the side rails 32 of the seat frame are fabricated with stub axles 36 that are rotatably supported within or on an opposing side rail 32. Each of the stub axles 36 includes a structure for coacting with the bar, for example, an opening, groove or slot 38 through which a straight end 82 of the bar 72 is received. Phantom lines 36a show the path of the bar into each opening 38. Each end 82 can be attached to its stub axle 36 by welding, or using a threaded connection, or forming a force fit and/or other similar means.

In view of the hinged connection, the bar 72 rotates about axis 80, between its operational positions. As can be appreciated, when the bar 72 is in its active or elevated position it will raise the blocking member 60. Obviously, the bar 72 will have mass, and gravity will tend to lower the bar. The bar 72 should remain in its elevated position until it is purposefully moved. In one embodiment, the bushing 34 or stub axle 36 is configured to have a sufficiently high level of friction or damping such that the bar 72 will tend to stay in its chosen position (fully raised, partially raised or down), as chosen by the driver or other occupant. The amount of friction or damping at the bushing or stub axle is chosen not to allow the bar to move under its weight and the weight of the barrier 60.

Reference is made to FIGS. 4 and 5, which illustrate a blocking device 50 using the bar 72 in combination with a blocking member 60 in the form of a flexible netting 90. (The netting is not shown in FIG. 4 for the purpose of simplifying the illustration.) The lower edge 92 of the netting 90 is fixedly secured to a lower portion of the seat cushion. For example, the netting can be attached to the material covering 26 such as by sewing the lower edge to the lower edge of the material 26 or by using staples or c-clips. Each of these fastening methods is generally shown by number 93.

In the preferred embodiment, the netting 90 is secured to the lower front 40 and lower sides 42 of the seat cushion 24, however, it is not necessary secure the netting to the sides. The upper edge 94 of the netting is secured to the front 74 and sides 76 of the bar 72 and movable therewith. With the bar 72 in its lowered position the netting will assume a folded-up configuration in front of the seat cushion. As the bar 72 is moved from its lowered position (shown schematically in FIG. 4) to its upper position, the netting is extended so the netting 90 is positioned at least in front of the seating surface of the seat cushion in a position to block objects on the seat from moving off from the seat. In the illustrated embodiment the raised netting extends about the front or forward portion of the sides 42 to block objects from falling off the front-sides of the seat cushion.

Figure 6B:
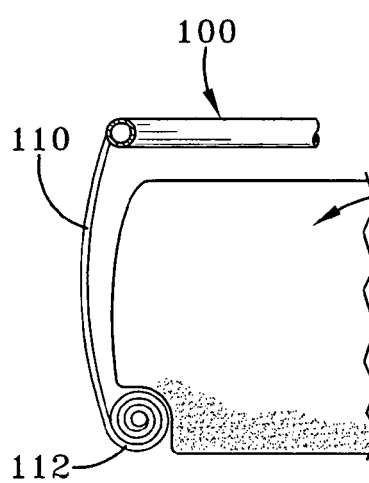
Figure 6C:
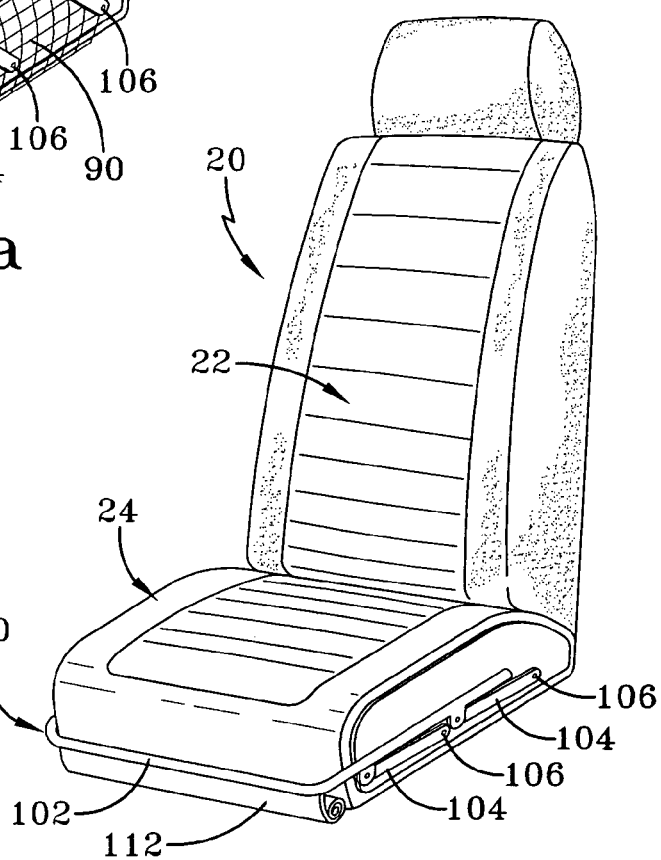
FIG. 6c shows the bar shown in FIG. 6a in a lowered position.

Reference is briefly made to FIGS. 6a, 6b and 6c, which illustrate an alternate embodiment of a blocking mechanism 50. In this embodiment, bar 72 is replaced with multi-bar mechanisms 100 comprising an upper bar 102 of similar function to bar 72 and two pivoted links or bars 104. One multi-bar mechanism is used on each side of the seat cushion. One end of each side bar 104 is pivotally connected to a corresponding seat cushion such as at the seat frame 30 or trim panel 24. The lower rotary hinge or joint is schematically shown as number 106. Each of the bars 104 is also connected to a corresponding side 103 of bar 102 at two upper rotary hinges or joints schematically identified as 108.

Further, the blocking mechanism 50 also includes a blocking member or barrier 60 in the form of a thin, flexible plastic sheet 110. The previously described netting 90 can also be used. An upper edge of the sheet 110 can be secured to the center portion of the bar 102 and the lower edge of the sheet 110 is operatively secured to the lower front of the seat cushion 24. For example, the lower edge of the sheet 110 can be fixedly secured to a lower edge of the seat or alternately, the lower edge of the sheet 110 can be secured to a spring-biased wind-up mechanism 112, similar to a spring-loaded bar of a Venetian blind used as a window covering. When the bar 100 is lowered as shown in FIG. 6c, the wind-up mechanism 112 rolls the flexible sheet therearound into a compact configuration. With the bar moved to its active position the sheet unrolls or extends from the wind-up mechanism 112. As should be appreciated, the netting 90 could have been substituted for the flexible sheet 110 in the above embodiment. A flexible netting 90 can be secured between the seat cushion and one or both sides 103 of the bar 102 to prevent objects from laterally slipping off the seat cushion 24.

Figure 7A:
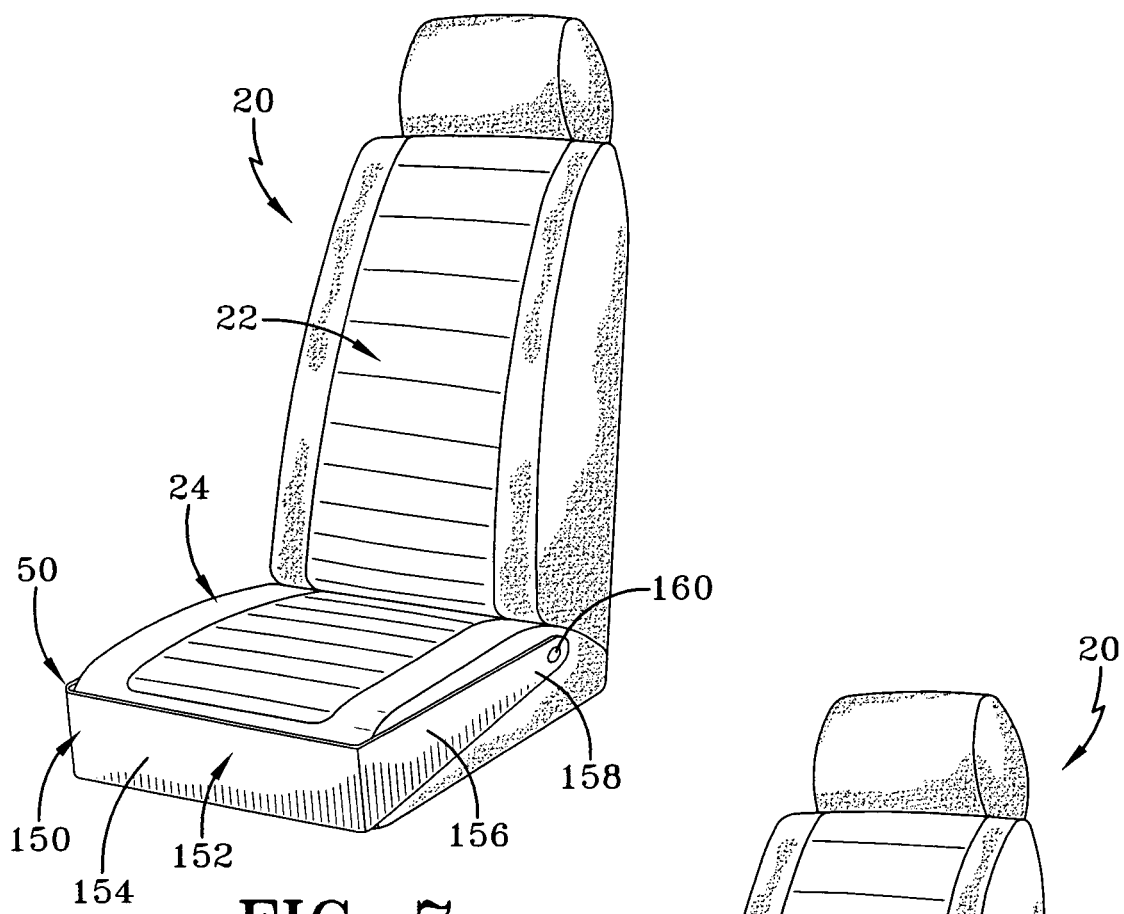
FIGS. 7a and 7b show an alternate embodiment of the invention.
Figure 7B:
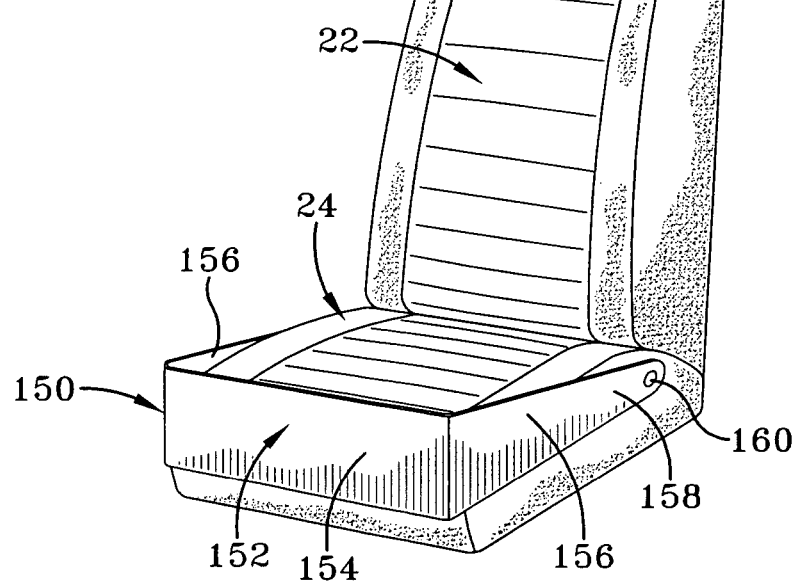

Reference is briefly made to FIGS. 7a and 7b, which illustrate an alternate device 50 in which the blocking member or barrier 60 and lift mechanism 70 are combined into a single movable barrier 150. The barrier 150 comprises a rigid or semi-rigid member, panel or shield 152, preferably made from pre-formed metal or plastic having a front 154 and integral sides 156. The ends 158 of each side 156 are rotatably hinged to the seat cushion in an acceptable manner at hinges that are schematically identified as 160. The barrier 150 is shown in its elevated position in FIG. 7b and in its lowered position in FIG. 7a. The integral barrier 150 prevents forward and lateral movement of objects on the seat cushion 24.

Figure 8A:
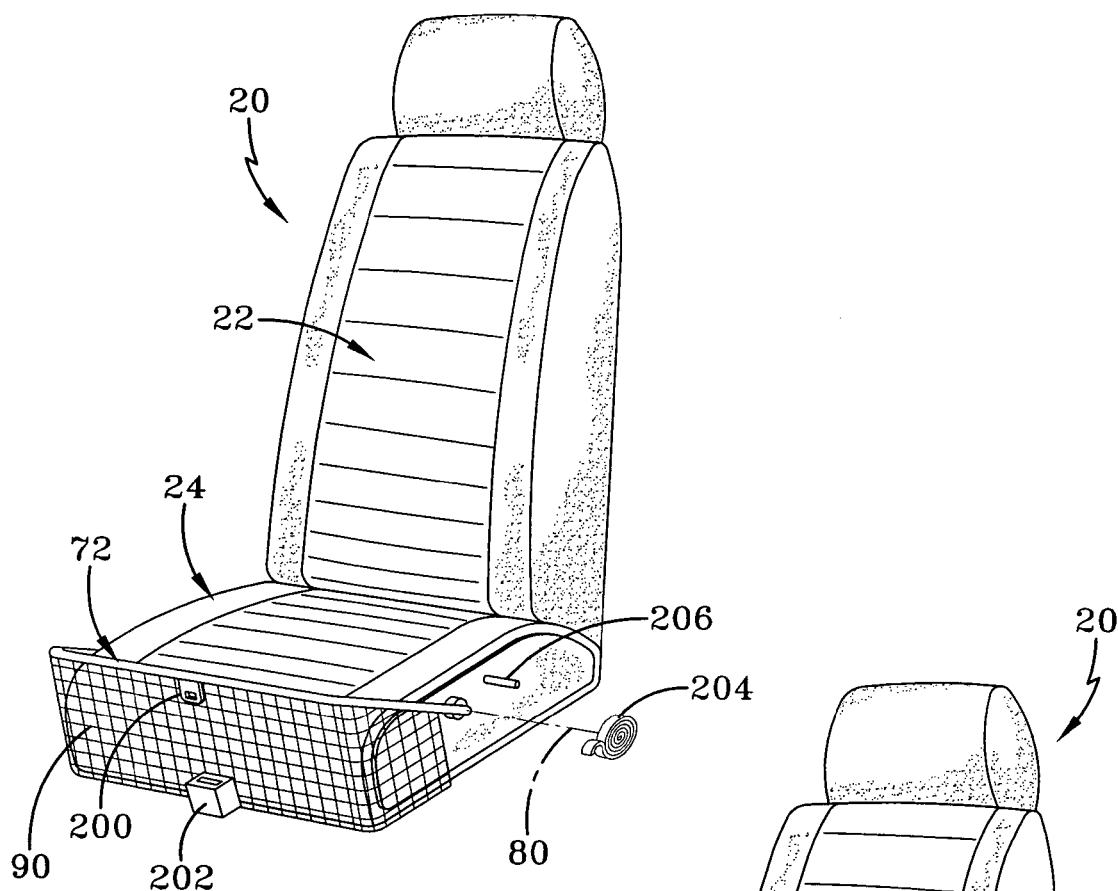
FIGS. 8a and 8b show an embodiment of the invention using a locking mechanism and bias spring.
Figure 8B:
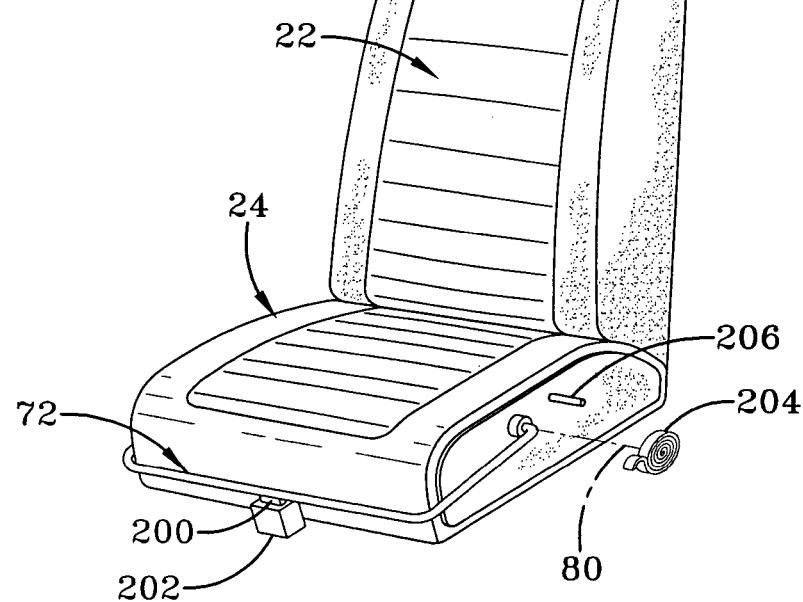

FIGS. 8a and 8b show an alternate way of holding a barrier and lifting the barrier to its active position. In this embodiment the bar 72 is fitted with or includes a first locking part such as a thin tongue. Positioned below the tongue 200, such as on a lower portion of the front of the seat cushion 24, is a mating second locking part 202, such as a manually releasable lock or catch mechanism. A bias spring 204 is mounted between the seat and bar 72 to provide a bias force to rotate the bar 72 about axis 80 to its elevated position. This spring 204 can be a leaf or helical spring and is preferably mounted within the seat cushion. For the purpose of illustration, spring 204 is shown aligned with axis 80 and the exterior of the cushion 24. When the bar is manually moved downwardly, the first and second locking parts 200 and 202 lockingly engage. In this condition spring 204 continues to bias bar 72 clockwise as seen in FIG. 8a.

To release the bar 72, the first and second locking mechanisms 200 and 203 are disengaged such as by depression of the tongue 200 further into the catch 202 (such as the catch found on doors or furniture) or pressing a release button (such as found on a seat belt buckle). Upon release, the bar 72 automatically moves to its raised position relative to the seat cushion under action of the spring. The mechanism of FIGS. 8a and 8b is provided with a mechanism stop generally shown by numeral 206. The upward motion of the bar 72 will stop upon engagement with stop 206. The net barrier 90 is shown in FIG. 8a and not in FIG. 8b to avoid cluttering FIG. 8b. Any of the embodiments mentioned earlier which use the netting 90, flexible sheet 110 or semi-rigid sheet 150 can also use the spring and first and second locking parts.

Reference is again briefly made to FIG. 5, which shows another embodiment of the invention. FIG. 5 schematically shows a motor 250 operatively linked to an end of bar 72 to rotate the bar positively and negatively about axis 80 in response to commands received from controller 252.

Figure 9:
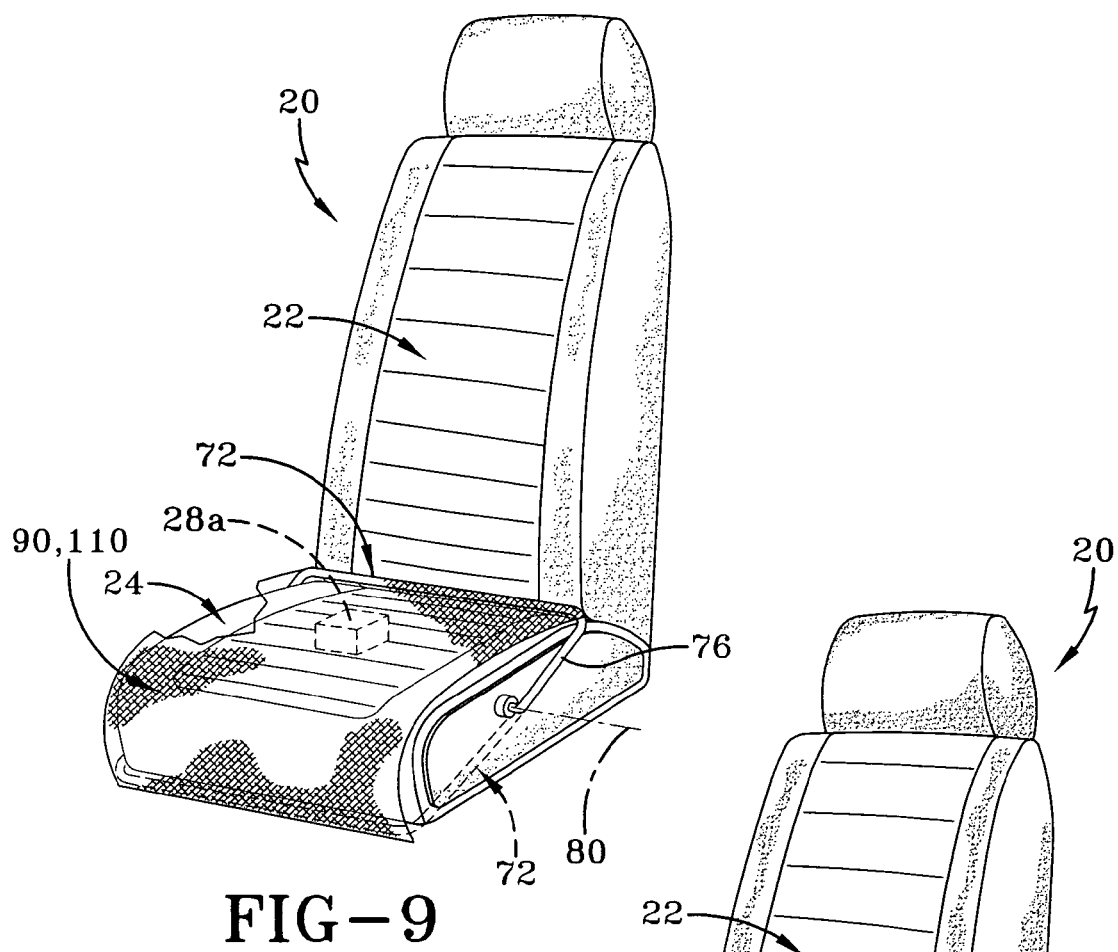
FIG. 9 shows another embodiment of the invention.

Reference is made to FIG. 9. In this embodiment the bar 72 is hinged relative to the seat cushion 24 to enable the bar 72 to move from a stowed position adjacent the lower-front of the seat cushion to an active position, generally at or near the junction of the seat back and seat cushion. In this embodiment the bar 72 is configured to rotate almost about 180 degrees and to remain at this activated position. A barrier such as the netting 90 or flexible sheet 110 is movable with the bar 72. In this embodiment when the bar 72 moves to its active position, the netting or sheet moves to cover virtually the entire seating surface as well as objects (see 28a) thereon. In addition to preventing the objects on the seat from sliding therefrom, this embodiment holds the objects to the seat, lessening or preventing such objects from moving or even tipping over.

Figure 10A:
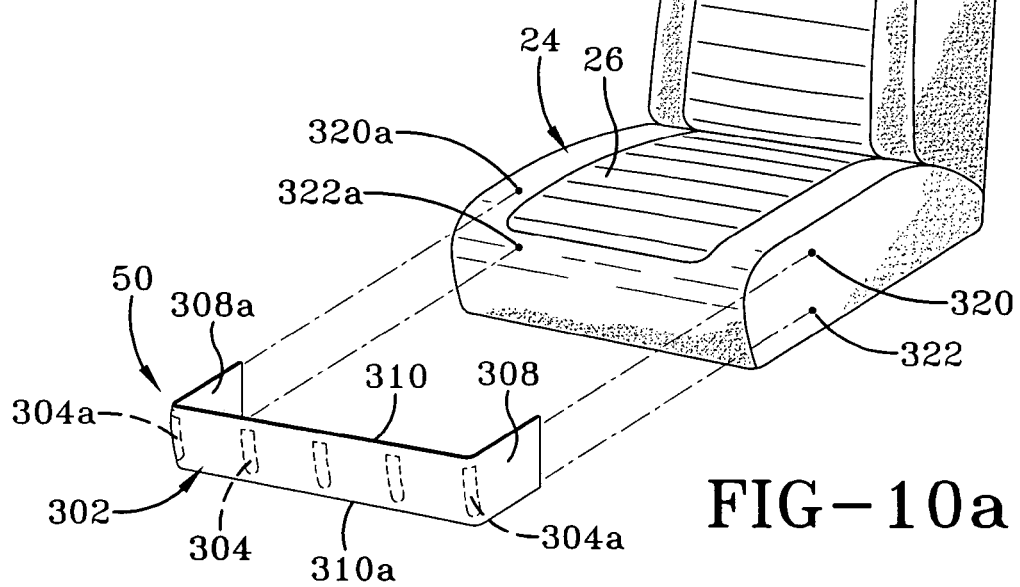
FIGS. 10a-10c show still another embodiment of the invention.

Reference is made to FIG. 10a, which shows an alternate embodiment of the invention. In this embodiment the barrier 50 is made from a flexible piece or panel of material 302 such as elastic woven fabric. In the illustrated embodiment the material 302 is generally rectangular in shape, however other shapes such as oval or triangular are useable with the invention. A plurality of rigid or semi-rigid reinforcements (reinforcement bars, stays or layers) 304 are embedded within or secured to material 302. The panel 302 is shown apart from the seat cushion in FIG. 10a. As illustrated, the reinforcements are straight in shape but other shapes such as U-shape can be used. These reinforcements can be made by inserting pieces of plastic within a layer or pocket of the material 302. The reinforcements would be similar to the reinforcements found in collars of certain men's shirts. The barrier 50 includes sides 308, and top and bottom generally identified as 310 and 310a respectively.

In one embodiment of the invention, the flexible material 302 is sewn, stapled, riveted or otherwise attached to the seat cushion such that end 308 of the material 302 is secured to the material 26 covering the sides of seat cushion at or between locations 320 and 322. The opposite end 308a of the material 302 is attached to the opposite side of the seat cushion generally between locations 320 and 322.

Figure 10B:
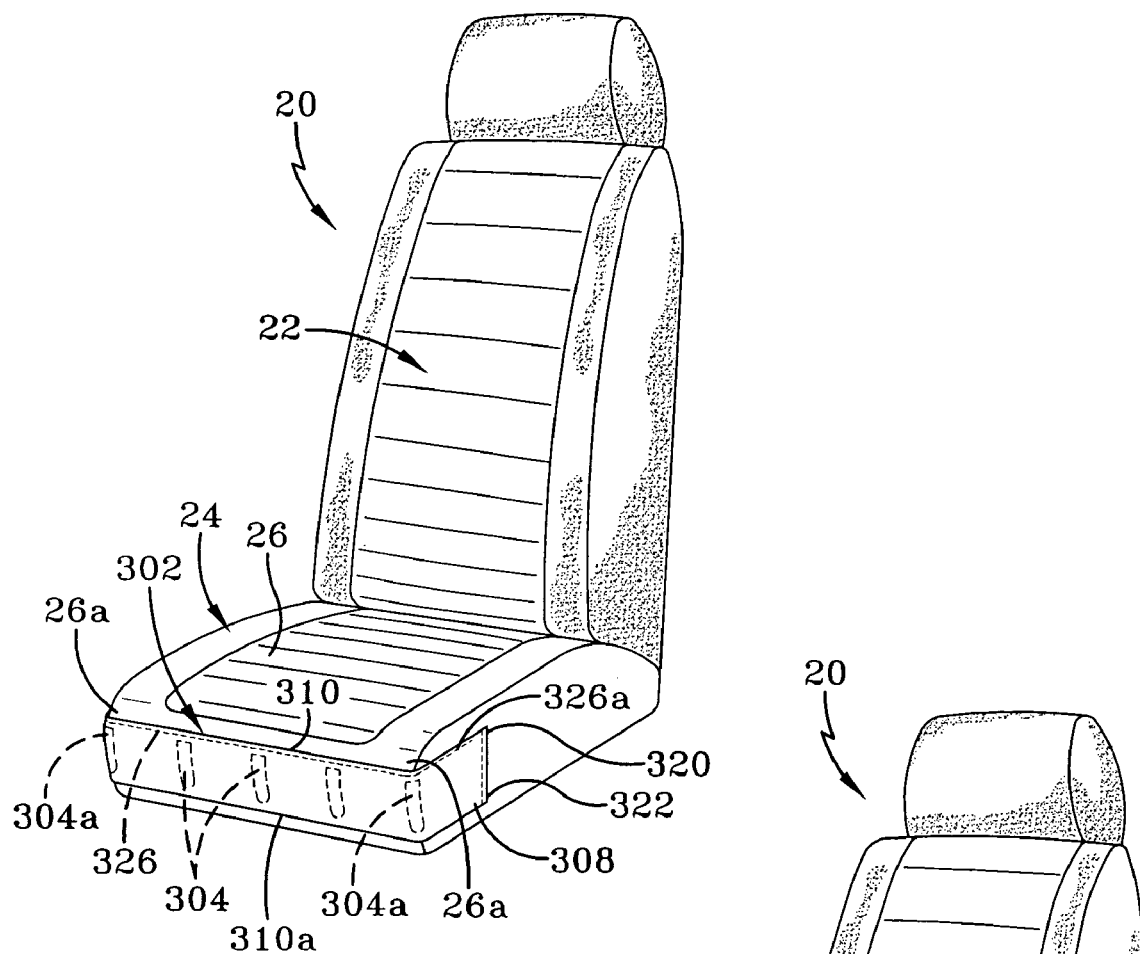

Reference is briefly made to FIG. 10b, which shows the barrier 302 secured to the seat cushion in the manner as mentioned above. The material 302 envelops the front 40 and at least portions of the sides 42 of the seat cushion. Some of the reinforcing members such as 304a are preferably positioned proximate a corner 26a of the seat cushion. In view of the flexibility of the material 302, the material will relatively tightly conform to the seat cushion. Numeral 324 is representative of an optional seam to secure side 308 to the cushion. While not shown, another seam (or securement) is associated with the other side 308a of the material 302.

Figure 10C:
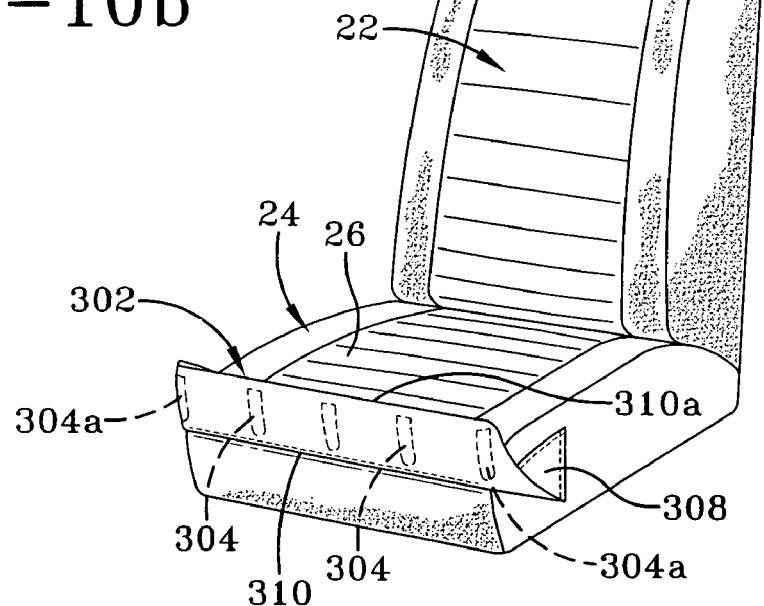

Reference is briefly made to FIG. 10c, which illustrates the barrier 50, that is the material 302, in its blocking position. In FIG. 10c, the driver or other occupant of the vehicle has grasped flexible material at its bottom 310a and raised and twisted the material 302 to relocate bottom edge 310a above the seat cushion with the top edge 310 of the material 302 in contact with the top front of the cushion 24. The reinforcing bars 304 react against the top-front of the cushion to maintain the material 302 between the reinforcing bars, in a generally vertical orientation, above cushion surface 26 to operate as a barrier, preventing objects from sliding off from the seat.

In the embodiment described above, it is not necessary to secure the top 310 of the material 302 directly to the seat cushion. In another embodiment of the invention, the top 310 of material 302 is secured to or near the top front of the cushion either along a seam or other securement. This seam is identified by numeral 326 in FIG. 10b. It is envisioned the material 302 would be secured across its entire length to the cushion at least across the front of the cushion. The seam can optionally extend to the top sides of the cushion (see number 326a).

Figure 11:
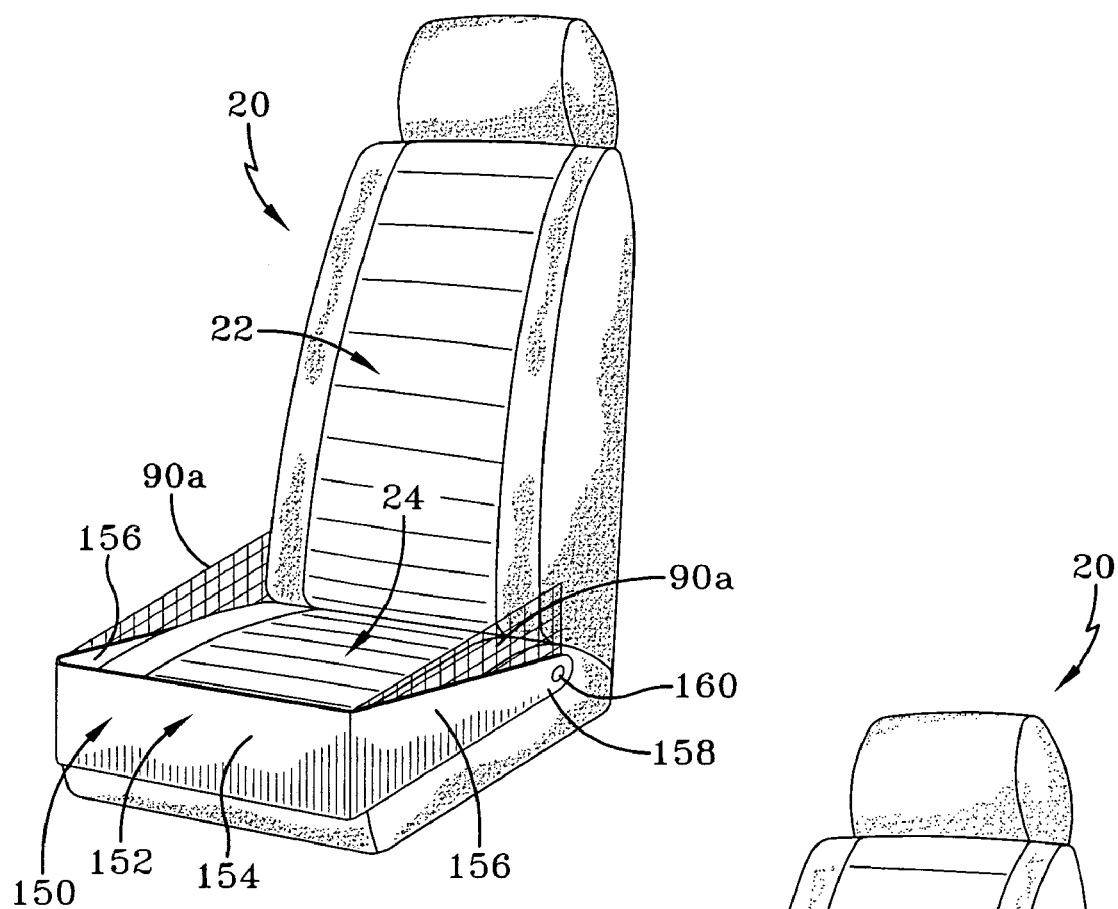
FIG. 11 shows a variation of the embodiment shown in FIGS. 7a and 7b.

Reference is briefly made to FIG. 11, which shows a variation of the embodiment shown in FIGS. 7a and 7b. In FIG. 11 side panels of netting 90a are added to provide greater side protection.

Figure 12:
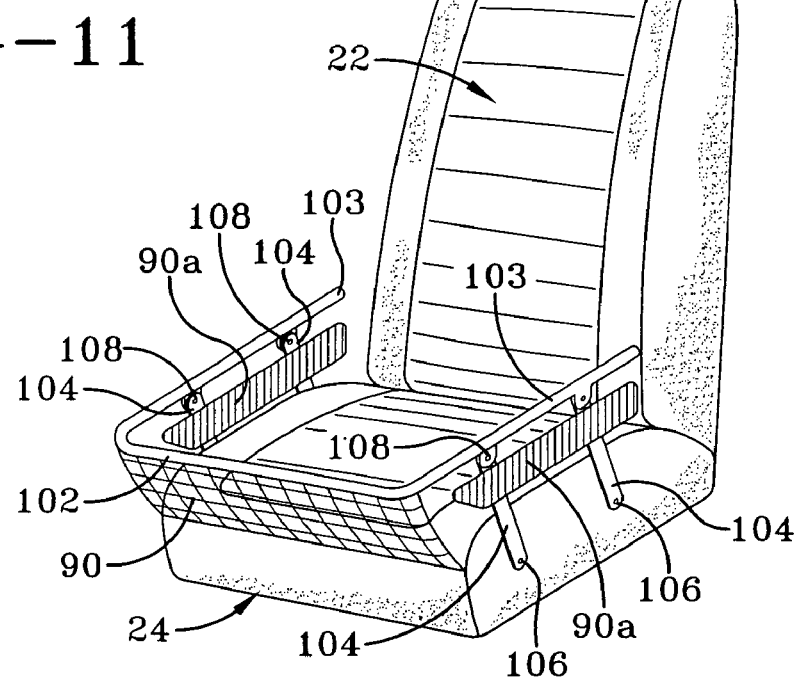

FIG. 12 shows an alternate to the embodiments shown in FIG. 6a. FIG. 12 also shows a multi-bar arrangement in which netting 90 extends from the front of the bar to the top-front of the seat cushion. Additionally, other sections of netting 90a are secured to the sides 103 of the bar and to the smaller bars or links 104. The side portions of netting 90a can be used on one or both sides of the barrier.

Figure 13:
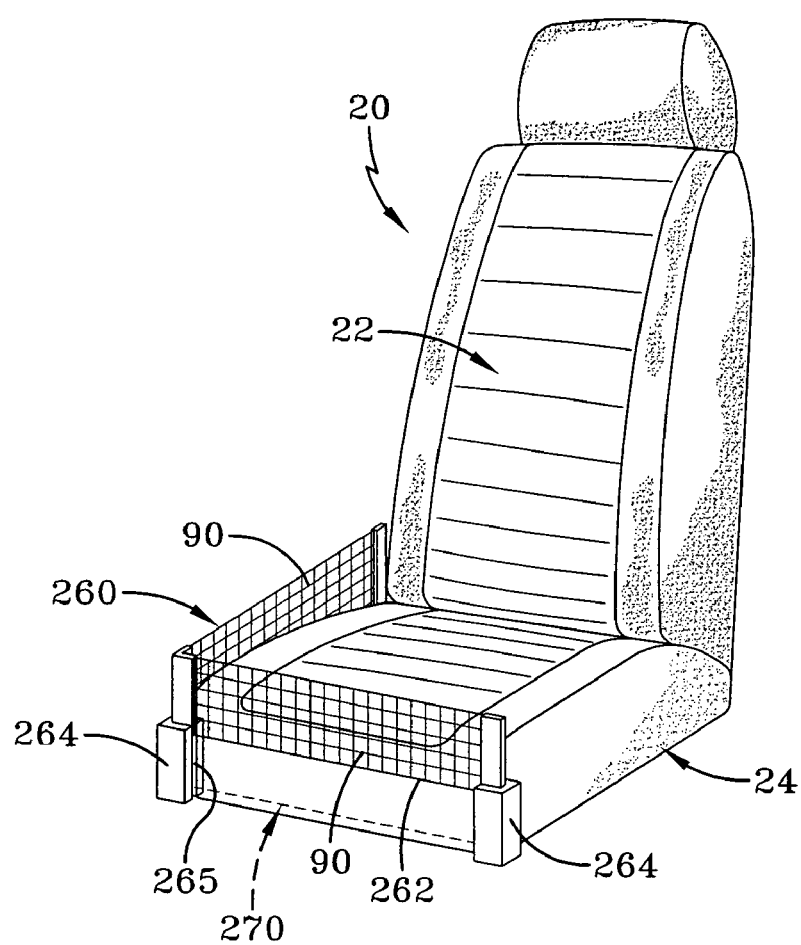
FIG. 13 shows an embodiment with a linearly movable barrier.

Reference is made to FIG. 13, which shows a linearly extendible and retractable barrier mechanism 260. In this embodiment the barrier mechanism comprises a slide 262, which is generally rectangular in shape. The slide may be solid or include a netting such as 90, supported within a frame. The slide 262 is movable into and out of a housing generally shown by numeral 264. The slide 262 and housing 264 cooperate in the same manner as a CD tray and housing used in a computer, radio or the like. For example, the housing 264 includes at least one channel 265 that supports the slide 262. The housing 264 includes release and moving mechanisms to move the slide (in the manner as a CD is moved). In the present invention the slide is generally vertically movable. When the slide 262 is in a raised position as shown in FIG. 13, the slide presents a barrier to any object on the seating surface. Numeral 270 diagrammatically represents the slide in a lowered positioned, withdrawn into the housing 264. A lateral barrier can be obtained by replicating the above embodiment and placing same at a side of the seat.

Figure 14A:
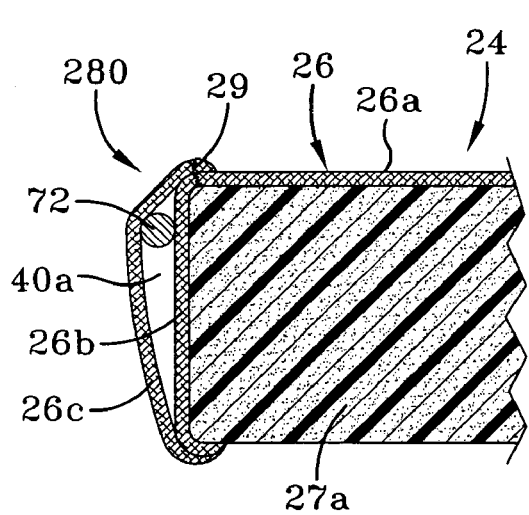
FIGS. 14a and 14b show a final embodiment of the invention.
Figure 14B:
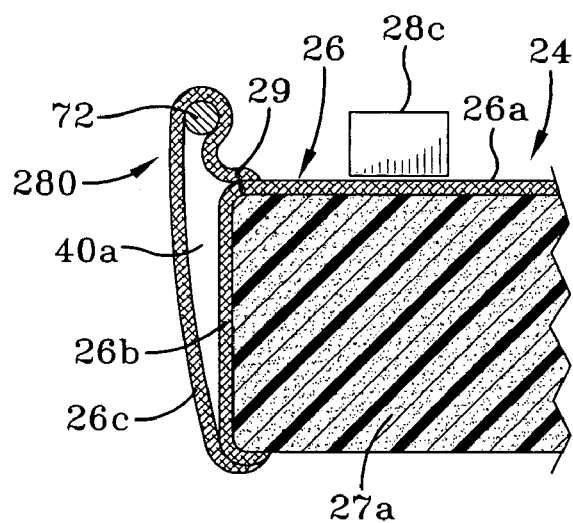
Figure 15:
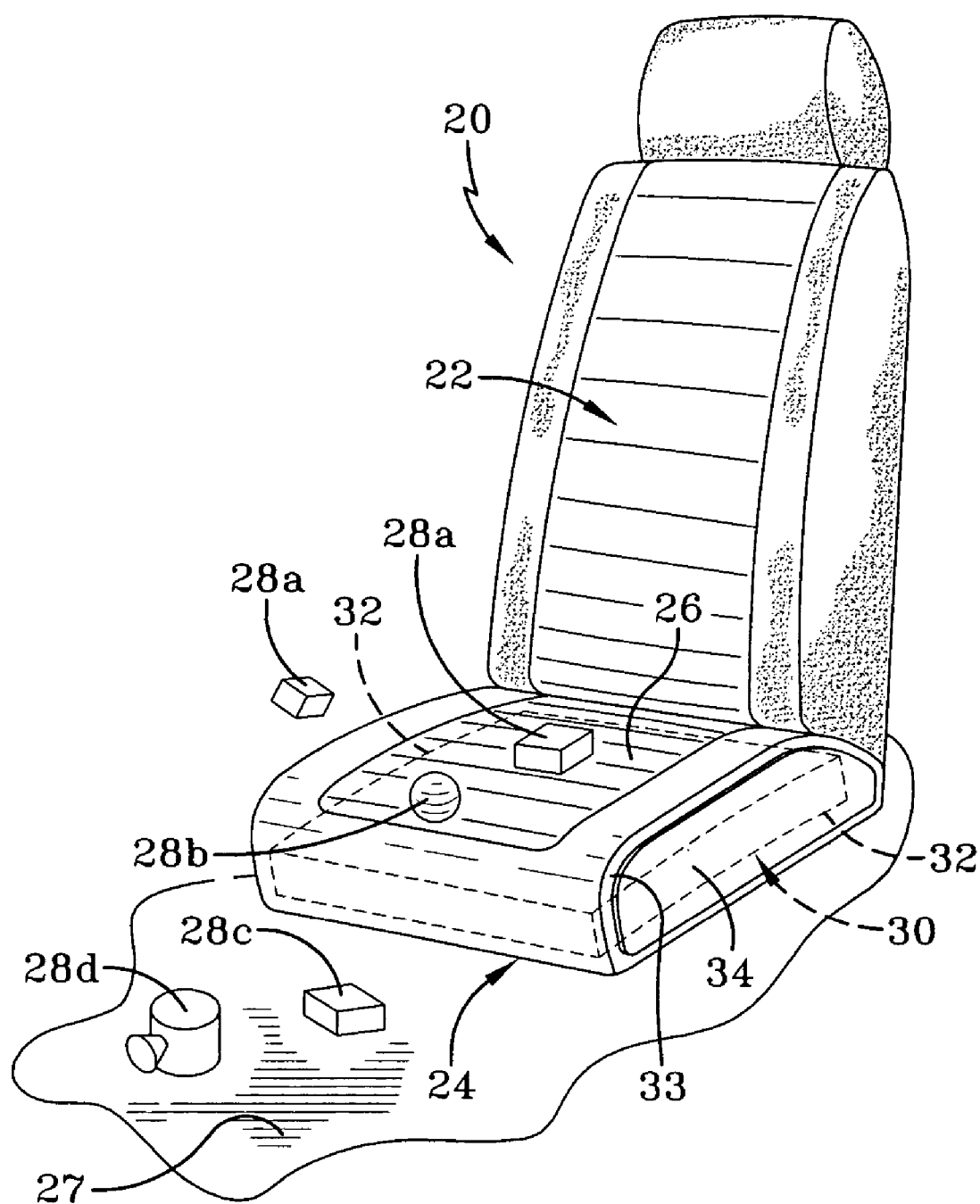
FIG. 15 shows a prior art vehicle seat.

FIGS. 14a and 14b show a barrier 280 enclosed within the seat covering material 26. FIG. 14b shows a cross-sectional view showing a seat cushion 24 comprising material 26 covering a foam cushion 27a. The material includes a top panel 26a and a second panel 26b covering the front and lateral sides of the cushion in a known manner. Numeral 29 shows the seam connecting the panels 26a and 26b. The illustrated cushion 24 further includes an exterior panel 26c, made of an elastic material, sewn to the panels 26a and 26b along the seam 29 and secured to the bottom of panel 26b. Panel 26c, in combination with panel 26b, forms a pocket 40a at the front of the seat cushion. Located within pocket 40a is a movable bar such as 72. Upward movement of bar 72 stretches panel 26c and elevates the top of panel 26c above the top surface of the cushion 24, providing a barrier to prevent objects on the cushion from sliding therefrom.

Many changes and modifications in the above-described embodiment of the invention can, of course, be carried out without departing from the scope thereof. Accordingly, that scope is intended to be limited only by the scope of the appended claims.

The invention claimed is:

1. A blocking mechanism or device (40) restraining objects laid on a seat cushion by preventing those objects from sliding off from a cushion (24) of a seat when a vehicle experiences decelerations above a given level or rapid changes in direction comprising:
    a blocking member configured to be movable from a storage position below a top surface of the cushion to a blocking position above the top surface along at least the front and front portion of at least one side of the seat cushion of the cushion to block any object on the cushion from moving therefrom
    wherein the blocking member is configured to rotate between the storage and active positions.

2. The device as defined in claim 1 wherein the blocking member is chosen from a group of netting or a foldable sheet.

3. The device as defined in claim 1 wherein the blocking member is spring biased toward the blocking position.

4. The device as defined in claim 1 wherein the blocking member is configured to be moved between the storage and active positions by a motor responsive to a control signal.

5. The device as defined in claim 1 wherein the blocking member is configured to align with a front edge of the seat cushion.

6. The device as defined in claim 1 wherein the blocking member is configured to align with a front edge of the seat cushion as well as opposing sides of the seat cushion.

7. A barrier operable with the seat cushion restraining objects placed on a seat cushion by preventing those objects on the seat cushion from moving or sliding off of the seat cushion:
    the barrier comprising a foldable material movable between a stowed position below the top of the cushion to raised or blocking positions above the top of the cushion along at least the front and front side portion of at least one side of the seat cushion and when in the raised position providing an obstruction to those objects on the seat cushion;
    wherein the foldable material is sewn or otherwise secured to the seat cushion.

8. A blocking mechanism or device (40) restraining inanimate objects placed on a seat cushion by preventing those inanimate objects from sliding off from the seat cushion (24) of a seat when a vehicle experiences decelerations above a given level or rapid changes in direction comprising:
    a blocking member configured to be rotatable from a storage position below a top surface of the cushion to a blocking position above the top surface of the cushion along at least the front and front side portion at least one side of the seat cushion to block any inanimate object on the cushion from moving therefrom.

* * * * *